(12) United States Patent
Kawasaki et al.

(10) Patent No.: US 7,777,852 B2
(45) Date of Patent: Aug. 17, 2010

(54) HIGH APERTURE RATIO IN-PLANE SWITCHING MODE ACTIVE MATRIX LIQUID CRYSTAL DISPLAY UNIT

(75) Inventors: Taku Kawasaki, Kanagawa (JP); Takayuki Konno, Kanagawa (JP); Shinichi Nishida, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 348 days.

(21) Appl. No.: 11/802,467

(22) Filed: May 23, 2007

(65) Prior Publication Data

US 2007/0273819 A1    Nov. 29, 2007

(30) Foreign Application Priority Data

May 25, 2006    (JP) .............................. 2006-145623

(51) Int. Cl.
*G02F 1/1343*    (2006.01)
*G02F 1/1333*    (2006.01)

(52) U.S. Cl. .......................... 349/141; 349/86; 349/110; 349/151

(58) Field of Classification Search ........................ None
See application file for complete search history.

(56) References Cited

U.S. PATENT DOCUMENTS

| 7,173,682 B2 * | 2/2007 | Kim et al. .................... 349/141 |
| 2004/0183977 A1 | 9/2004 | Kitagawa et al. |
| 2004/0218131 A1 * | 11/2004 | Kim et al. .................... 349/141 |
| 2005/0078257 A1 | 4/2005 | Lee et al. |
| 2005/0286003 A1 * | 12/2005 | Lee et al. .................... 349/141 |
| 2006/0238694 A1 * | 10/2006 | Chen et al. .................. 349/156 |

FOREIGN PATENT DOCUMENTS

| CN | 1532617 | 9/2004 |
| CN | 1605917 | 4/2005 |
| JP | 2002-258321 | 9/2002 |
| JP | 2005-70747 | 3/2005 |

OTHER PUBLICATIONS

Chinese Patent Office issued a Chinese Office Action dated Jul. 24, 2009, Application No. 2007101045349.

* cited by examiner

*Primary Examiner*—Tina M Wong
(74) *Attorney, Agent, or Firm*—Young & Thompson

(57) ABSTRACT

In a liquid crystal display unit where a matrix pattern of pixels are defined by gate lines and crosswise data lines, transparent pixel electrodes are formed on the same layer as the data lines and corresponding transparent common electrodes are formed above the transparent pixel electrodes. On the common electrodes the liquid crystal layer is provided. In the aperture of each pixel, the common electrode has a pattern of parallel stripe portions and a peripheral portion outside of the aperture for shielding the field of the corresponding data line. Each pixel electrode cooperates with that parallel stripe portions of the corresponding common electrode to produce inner fringe fields along such parallel stripe portions and has portions that overlap the peripheral portions of the common electrode to produce peripheral fringe fields so that liquid-crystal cells can be uniformly in-plane switched by the inner fringe fields as well as by the peripheral fringe fields.

8 Claims, 4 Drawing Sheets

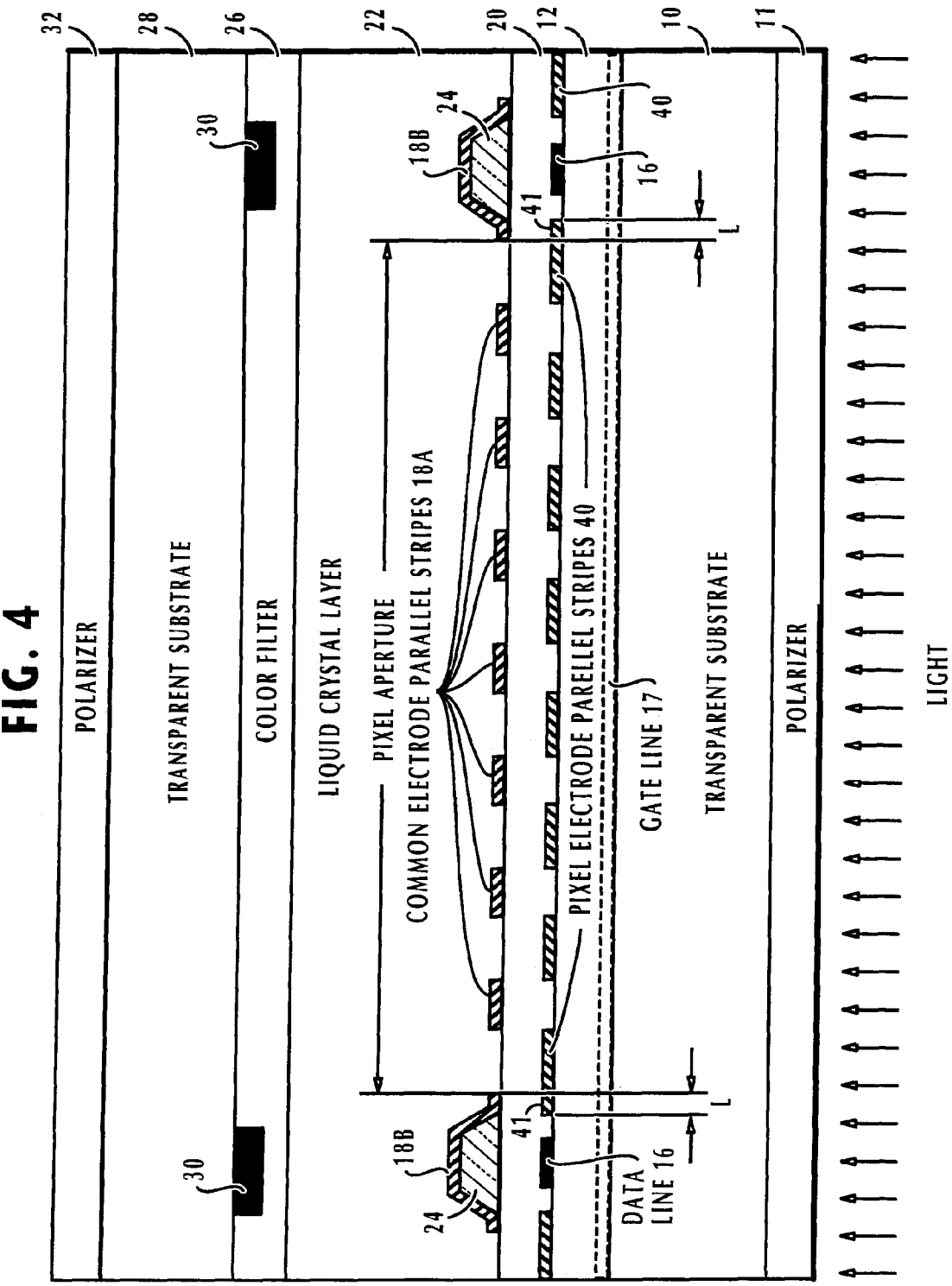

HIGH APERTURE RATIO IN-PLANE SWITCHING MODE ACTIVE MATRIX LIQUID CRYSTAL DISPLAY UNIT

BACKGROUND OF THE INVENTION

1. Field of the Invention

The present invention relates to an in-plane switching (IPS) mode active matrix liquid crystal display unit.

2. Description of the Related Art

Japanese Patent Publication 2005-70747 (referred to as Document 1) discloses a liquid crystal display unit, which can be classified into one of IPS-mode display units. The prior art display unit comprises a lower structure and an upper structure and accommodates a liquid crystal layer between the upper and lower structures. The whole unit is illuminated with backlight provided below the lower structure. The lower structure consists of a transparent substrate on which a transparent common electrode (first ITO electrode) is formed and coated with an insulating layer. For each pixel, a data line is provided on the insulating layer and coated with a protection layer, on which transparent parallel pixel electrodes (second ITO electrodes) are provided. However, the data lines are not shielded from the liquid crystal layer, the electric fields of the data lines adversely affect the orientation of the liquid crystals and cause portions of the backlight that pass through the edges of the data line to leak to the viewer side. For shielding such undesired leaking light, the upper structure is provided with a black matrix. Since the black matrix occupies a relatively large space, the aperture ratio of the prior art LCD unit is not satisfactory.

Japanese Patent Publication 2002-258321 (referred to as Document 2) discloses an IPS-mode LCD unit in which a lower structure and an upper structure are provided for accommodating a liquid crystal layer and the whole unit is illuminated with backlight in a manner similar to Document 1. The lower structure consists of a transparent substrate, transparent pixel electrodes and data lines, which are formed above the transparent substrate. The pixel electrodes and the data lines are coated with a protection layer on which common electrodes are provided. For each pixel, each common electrode comprises an inner electrode positioned inside of the pixel aperture and an outer edge portion, which overlies the corresponding data line and is raised from the protection layer by an insulator.

Although the data lines of Document 2 are covered with the outer edge portions of the common electrodes, the data lines are still not satisfactorily shielded from the liquid crystal layer. Therefore, liquid crystals are still adversely affected in their orientation by the stray field components of the data lines. Additionally, since transversal field component that contributes to the in-plane switching of liquid crystal is depleted in the area immediately above each common electrode, light transmissivity in this area is low, resulting in a low controllability of light transmissivity. Further, high precision technique is required to control the width of each common electrode because it noticeably affects on the electric field that contributes to the in-plane switching.

SUMMARY OF THE INVENTION

It is therefore an object of the present invention to provide an in-plane switched mode active matrix liquid crystal display unit having a high aperture ratio.

According to the present invention, there is provided a liquid crystal display unit comprising a plurality of parallel gate lines, a plurality of parallel data lines on a first layer above said gate lines, said data lines extending crosswise to said gate lines for defining a matrix pattern of pixels at intersections with said gate lines, a plurality of transparent pixel electrodes on said first layer corresponding in position to said pixels, a plurality of transparent common electrodes arranged on a second layer above said first layer corresponding in position to both of said pixels and said pixel electrodes, and a liquid crystal layer on said transparent common electrodes. Each of the common electrodes has a pattern of parallel stripe portions inside of an aperture of the corresponding pixel and a peripheral portion outside of said aperture for shielding undesired field generated by a corresponding one of said data lines. Each of the pixel electrodes cooperates with the parallel stripe portions of the corresponding common electrode for uniformly generating fringe fields along the parallel stripe portions of the common electrode.

Preferably, each pixel electrode has an overlapping portion that laterally extends beyond the aperture to overlap the peripheral portion of the corresponding common electrode by a predetermined amount to produce peripheral fringe fields along the peripheral portion of the corresponding common electrode, whereby liquid-crystal cells in the aperture can be in-plane switched uniformly by the inner fringe fields as well as by the peripheral fringe fields.

Preferably, the liquid crystal layer has a thickness that is sufficient for the liquid-crystal cells to be in-plane switched by fringe fields to produce a maximum light transmissivity. This thickness is greater than the thickness of a liquid crystal layer that is driven by lateral fields.

Further, the predetermined amount of the overlapping portion is 1.0 to 1.5 µm. Additionally, each of the pixel electrodes has a pattern of parallel stripe portions arranged in the aperture in a staggered relation to the parallel stripe portions of the corresponding common electrode. In addition, the outer edge portion of each common electrode is raised from the second layer by an insulator formed of polymer such as resin.

BRIEF DESCRIPTION OF THE DRAWINGS

The present invention will be described in detail with reference to the following drawings, in which:

FIG. 4 is a vertical cross-sectional view of the liquid crystal display unit according to a second embodiment of the present invention.

DETAILED DESCRIPTION

Figure 1:
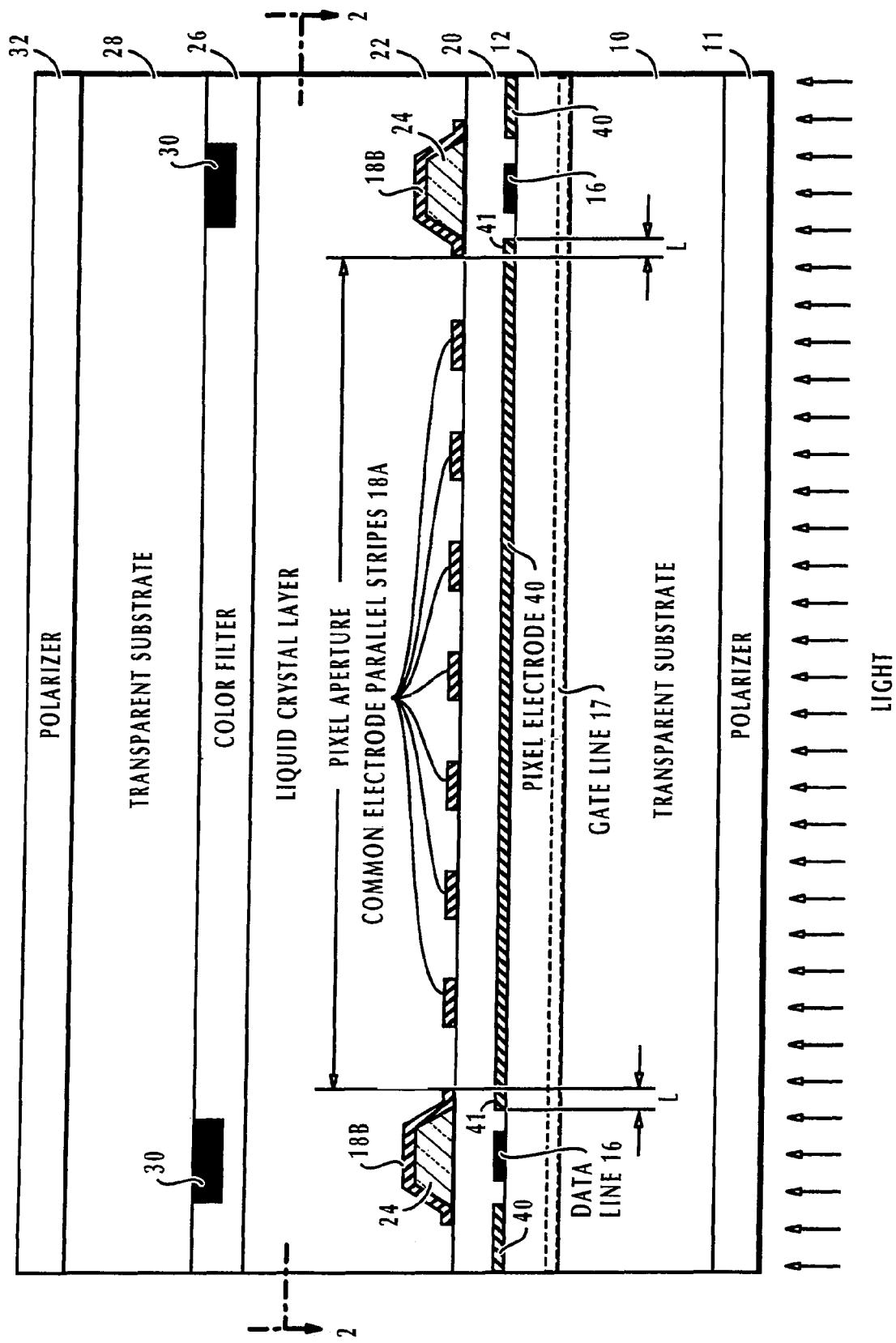
FIG. 1 is a vertical cross-sectional view of the IPS-mode active matrix liquid crystal display unit according to a first embodiment of the present invention for illustrating only one pixel of a multitude of pixels arranged in a matrix pattern.

FIG. 1 shows, in vertical cross-section, an in-plane switching mode active matrix liquid crystal display unit according to a first embodiment of the present invention. The LCD unit comprises a transparent substrate 10 on a polarizer 11, which is exposed to backlight. On the substrate 10 a plurality of parallel gate lines 17 are formed, the gate lines 17 being covered with a transparent insulating layer 12. On the insulating layer 12 are a pattern of parallel data lines 16 extending crosswise to the gate lines 17 to define a matrix pattern of pixels with the data lines 16. A pattern of pixel electrodes 40 are formed on the insulating layer 12 so that each pixel electrode 40 is positioned at an intersection of a data line 16 and a gate line 17. The data lines 16 and the pixel electrodes 40 are covered with a transparent insulating layer 20 for protecting thin-film transistors not shown. On the insulating layer 20, a pattern of insulators 24 is formed with polymer so that each insulator 24 is positioned above and runs parallel with a data line 16.

On the insulating layer 20, a common electrode 18 is provided for each pixel electrode 40. The common electrode 18 is formed in a pattern of parallel stripes 18A within a pixel aperture defined by a pair of peripheral portions 18B that cover the raised insulating areas 24 and a pair of peripheral portions 18C that extend between the peripheral portions 18B. The polymer-insulated raised peripheral portions 18B of the common electrode 18 have the effect of effectively shielding the liquid crystal layer 22 from the stray electric fields of data lines 16.

Figure 2:
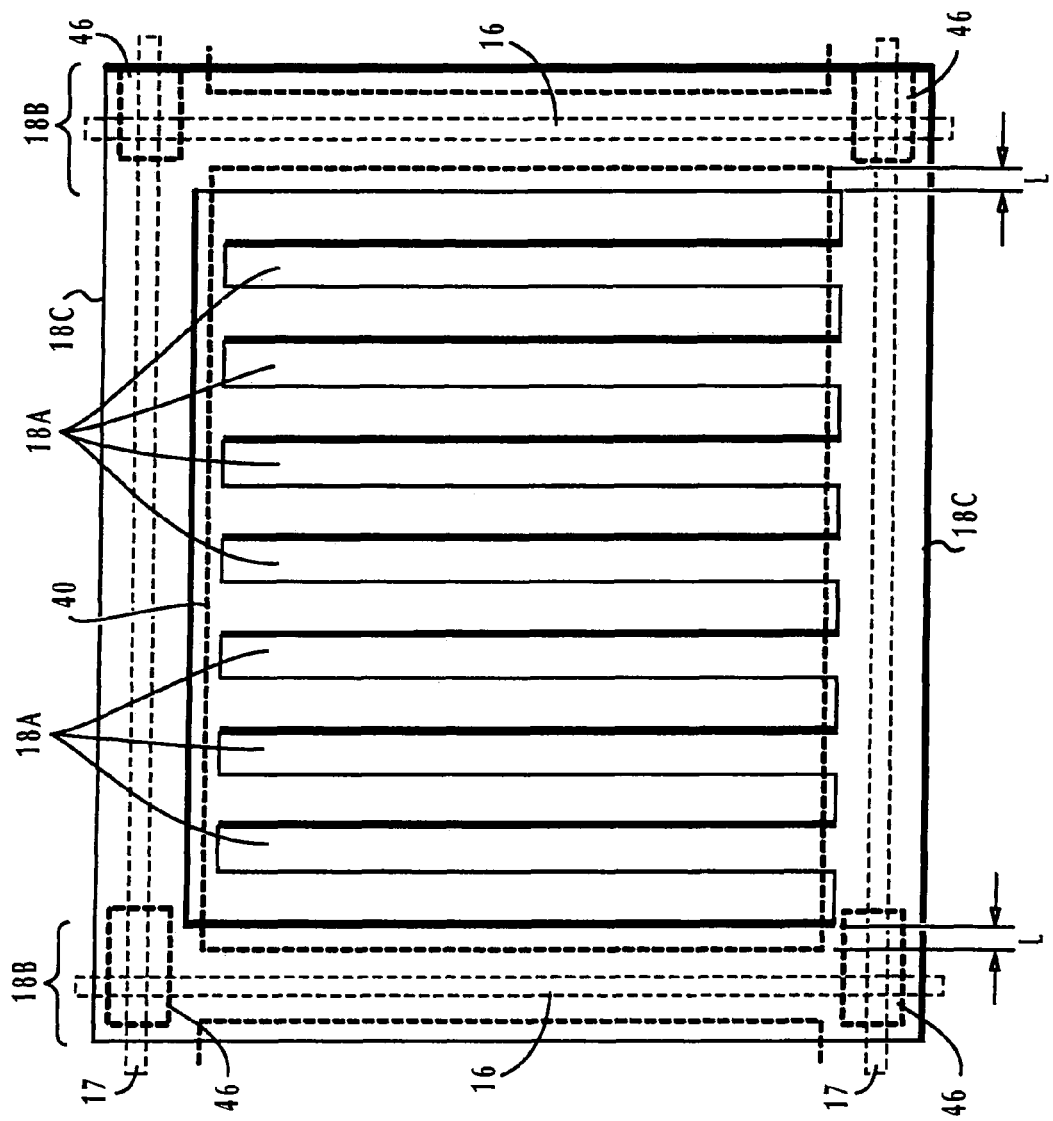
FIG. 2 is a plan view taken along the line 2-2 of FIG. 1 to reveal the common electrodes.

In a preferred embodiment, it is desirable that the insulators 24 be formed such that the stray capacitance between the common electrodes 18B and the data lines 16 be as small as possible since this reduces the delay time which would be introduced to the common potential. The horizontal crosstalk can be minimized in this way. Suitable material for the insulator 24 is resin. In one form of the parallel stripes 18A of the common electrode 18, they are patterned in the shape of a comb as shown in FIG. 2.

On the common electrodes 18 is a liquid crystal layer 22. A transparent substrate 28 fitted with a color filter 26 is applied over the liquid crystal layer 22. A black matrix 30 is embedded in the color filter 26 in positions corresponding to the data lines 16. A polarizer 32, polarized at right angles to the polarization plane of polarizer 11, is provided on the viewer side of transparent substrate 28 to allow light components polarized by the liquid crystals to be seen by viewers. A thin-film transistor 46 is provided for each pixel to activate the pixel electrode 40. Note that the conductive stripes 18A of the common electrode are preferably arranged to run parallel with the data lines 16.

According to the present invention, each pixel electrode 40 has peripheral edge portions 41, which extend outwards beyond the pixel aperture and overlap the outer edge portions 18B of the corresponding common electrode by an amount indicated by length "L". With the overlapped configuration of the edge portions 41 of pixel electrode 40 with the vertical peripheral portions 18B of common electrode 18, electric fields of the data lines are shielded from the liquid crystal layer 22, thus preventing them from adversely affecting the orientation of the liquid crystal cells in the neighborhood of the data lines 16. As a result, portions of backlight that would otherwise leak through the neighborhood of the data lines 16 to the viewing side of the liquid crystal display unit are eliminated, and the total light transmissivity of the pixel aperture is improved.

Figure 3:
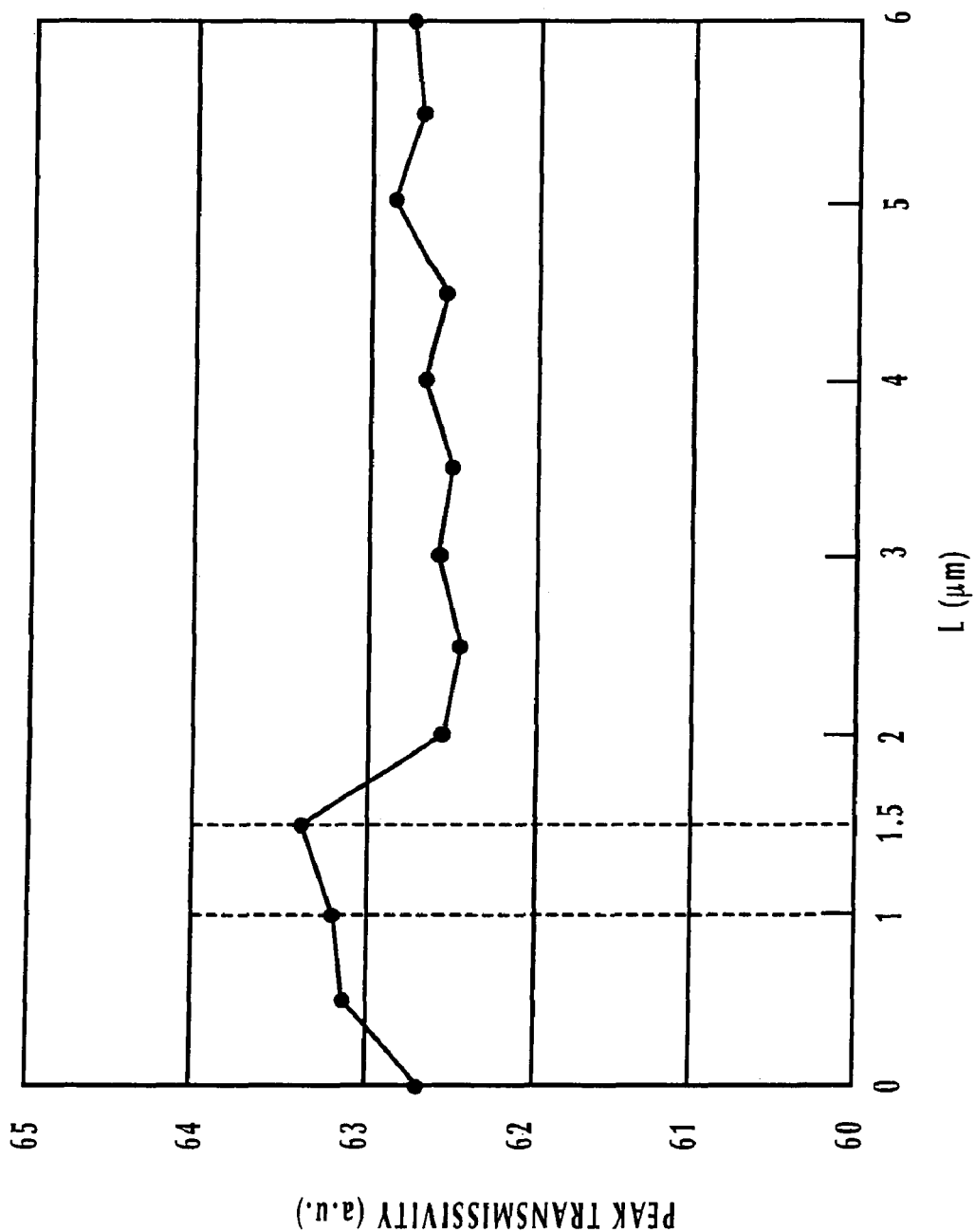
FIG. 3 is a graphic representation of peak transmissivity of the liquid crystal display unit of the present invention.

FIG. 3 is a graphic representation of peak transmissivity in the neighborhood of each data line 16 measured as a function of overlap length "L". It is seen that the overlap "L" is preferably 1 to 1.5 μm to obtain high peak transmissivity.

Since the backlight is prevented from leaking through the neighborhood of the data lines 16 to the viewer side as described above, the width of black matrix 30 can be made narrower than the prior art. Therefore, an increased aperture ratio can be obtained.

In comparison with Document 2, the parallel stripe portions 18A of the common electrode are provided in number sufficient to produce a plurality of inner fringe fields. The inner fringe fields generated in such a manner drive the liquid crystal cells to alter their orientation, which in turn cause the portions of liquid-crystal cells above the parallel conductive stripe portions 18A to alter their orientation by means of intervening elastic power. In this way, those portions of liquid-crystal cells above the parallel conductive stripe portions 18A contribute to the improvement of light transmissivity.

In addition, since the liquid-crystal cells are "in-plane" switched by fringe fields, the effective refractive index anisotropy $\Delta n$ of liquid crystal cells driven by fringe fields as viewed in a direction normal to the plane of the liquid crystal layer 22 is small in comparison with the effective refractive index anisotropy $\Delta n$ of liquid crystal cells driven by "lateral fields" of the prior art as described in Document 2. Therefore, the retardation ($\Delta n \times d$) (where d is the thickness of the liquid crystal layer, known as cell gap) of the fringe-field-driven cells would be smaller than the retardation of the lateral-field-driven cells.

The light transmissivity of the liquid crystal layer 22 driven by fringe fields can be maximized by setting the cell gap of the fringe-field-driven cells greater than the lateral-field-driven cells. In the present invention, inner fringe fields are generated along the parallel stripe portions 18A and peripheral fringe fields are generated along the peripheral portions 18B that overlap the portions 41 of the pixel electrode. Thus, in each pixel aperture, the liquid-crystal cells are uniformly driven by the inner fringe fields in the inner area as well as by the peripheral fringe fields in the peripheral areas.

If lateral fields were used in the inner area of the aperture in the same way as Document 2, the thickness of the liquid crystal layer 22 (cell gap) would be set to a value appropriate for lateral-field operation. As a result, the cell gap would be too small for driving liquid-crystal cells in the peripheral areas of the aperture, and hence the retardation ($\Delta n \times d$) would be insufficient to obtain maximum transmissivity.

In order to solve this problem, the thickness of the liquid crystal layer 22 (cell gap) of the present invention is set to a value greater than the thickness of a liquid crystal layer driven by lateral fields. As a result, the retardation ($\Delta n \times d$) of the liquid crystal layer 22 assumes an equal value over the full area of each pixel aperture that is commensurate with fringe-field mode of operation. High light transmissivity is ensured in this way.

In the first embodiment of the present invention, the pixel electrode 40 is provided to cover the whole area of the pixel aperture. In a second embodiment of the invention, the pixel electrode 40 is modified as shown in FIG. 4 so that it is patterned into a comb-like shape. The comb-like pixel electrode has a plurality of conductive parallel stripe portions 42 arranged in a staggered relationship to the common-electrode conductive parallel stripe portions 18A across the opposite surfaces of protection layer 20. According to this staggered arrangement, electric fields useful for producing in-plane switching can be increased in comparison with the arrangement of FIG. 1.

What is claimed is:

1. A liquid crystal display unit comprising:
a plurality of parallel gate lines;
a plurality of parallel data lines on a first layer above said gate lines, said data lines extending crosswise to said gate lines for defining a matrix pattern of pixels at intersections with said gate lines;
a plurality of transparent pixel electrodes on said first layer corresponding in position to said pixels;
a plurality of transparent common electrodes arranged on a second layer above said first layer corresponding in position to both of said pixels and said pixel electrodes; and
a liquid crystal layer on said transparent common electrodes, wherein each of the common electrodes has a pattern of parallel stripe portions inside of an aperture of the corresponding pixel and a peripheral portion outside of said aperture for shielding undesired field generated by a corresponding one of said data lines, wherein each of the pixel electrodes cooperates with the parallel stripe portions of the corresponding common electrode for uniformly generating fringe fields along said parallel stripe portions, and wherein each of said pixel electrodes has an overlapping portion that laterally extends beyond said aperture to overlap said peripheral portion of the corresponding common electrode by a predetermined amount to produce peripheral fringe fields along said peripheral portion.

2. The liquid crystal display unit of claim 1, wherein said liquid crystal layer has a thickness sufficient for said liquid-crystal cells to be in-plane switched by said fringe fields to produce a maximum light transmissivity.

3. The liquid crystal display unit of claim 1, wherein said liquid crystal layer has a thickness greater than a thickness of a liquid crystal layer driven by lateral fields.

4. The liquid crystal display unit of claim 1, wherein said predetermined amount of said overlapping portions is 1.0 to 1.5 μm.

5. The liquid crystal display unit of claim 1, wherein each of said pixel electrodes has a pattern of parallel stripe portions arranged in said aperture in a staggered relation to the parallel stripe portions of the corresponding common electrode.

6. A liquid crystal display unit comprising:

a plurality of parallel gate lines;

a plurality of parallel data lines on a first layer above said gate lines, said data lines extending crosswise to said gate lines for defining a matrix pattern of pixels at intersections with said gate lines;

a plurality of transparent pixel electrodes on said first layer corresponding in position to said pixels;

a plurality of transparent common electrodes arranged on a second layer above said first layer corresponding in position to both of said pixels and said pixel electrodes; and a liquid crystal layer on said transparent common electrodes, wherein each of the common electrodes has a pattern of parallel stripe portions inside of an aperture of the corresponding pixel and a peripheral portion outside of said aperture for shielding undesired field generated by a corresponding one of said data lines, wherein each of the pixel electrodes cooperates with the parallel stripe portions of the corresponding common electrode for uniformly generating fringe fields along said parallel stripe portions, and wherein each of said pixel electrodes laterally extends over the full area of the aperture of the corresponding pixel.

7. A liquid crystal display unit comprising:

a plurality of parallel gate lines;

a plurality of parallel data lines on a first layer above said gate lines, said data lines extending crosswise to said gate lines for defining a matrix pattern of pixels at intersections with said gate lines;

a plurality of transparent pixel electrodes on said first layer corresponding in position to said pixels;

a plurality of transparent common electrodes arranged on a second layer above said first layer corresponding in position to both of said pixels and said pixel electrodes; and a liquid crystal layer on said transparent common electrodes, wherein each of the common electrodes has a pattern of parallel stripe portions inside of an aperture of the corresponding pixel and a peripheral portion outside of said aperture for shielding undesired field generated by a corresponding one of said data lines, wherein each of the pixel electrodes cooperates with the parallel stripe portions of the corresponding common electrode for uniformly generating fringe fields along said parallel stripe portions, and wherein said outer edge portion of each common electrode is raised on said second layer by an insulator formed of polymer.

8. The liquid crystal display unit of claim 7, wherein said polymer is resin.

* * * * *